US006618920B1

(12) United States Patent
Emanuel

(10) Patent No.: US 6,618,920 B1
(45) Date of Patent: Sep. 16, 2003

(54) WHEEL STUD INSTALLATION TOOL

(76) Inventor: Cedric R. Emanuel, 12302 Orleans, Crosby, TX (US) 77532

( * ) Notice: Subject to any disclaimer, the term of this patent is extended or adjusted under 35 U.S.C. 154(b) by 0 days.

(21) Appl. No.: 09/563,687

(22) Filed: May 3, 2000

Related U.S. Application Data

(62) Division of application No. 09/294,421, filed on Apr. 19, 1999, now abandoned.

(51) Int. Cl.[7] ................................................ B23P 19/00
(52) U.S. Cl. ........................................................ 29/257
(58) Field of Search .......................... 29/257, 251, 270, 29/281.1, 256, 217; 269/249

(56) References Cited

U.S. PATENT DOCUMENTS

| | | | | |
|---|---|---|---|---|
| 569,527 A | * 10/1896 | Tilton | .......................... | 29/257 |
| 1,498,638 A | * 6/1924 | Periolat | ........................ | 29/257 |
| 4,235,004 A | * 11/1980 | Floyd | .......................... | 29/257 |
| 4,976,280 A | * 12/1990 | Lagana | ........................ | 29/217 |
| 4,977,660 A | * 12/1990 | Maynard | ..................... | 29/251 |
| 5,713,117 A | * 2/1998 | Bliss | ........................... | 29/257 |
| 5,857,252 A | * 1/1999 | Jansen | ......................... | 29/251 |
| 5,898,985 A | * 5/1999 | Villarreal | ..................... | 29/257 |

* cited by examiner

*Primary Examiner*—Robert C. Watson
(74) *Attorney, Agent, or Firm*—Darcell Walker

(57) ABSTRACT

The stud replacement kit of the present invention operates by supplying force to the inside portion of a damaged stud and pushing that stud forward and out of the wheel. The kit of the present invention comprises a pressure tool that supplies force to a stud. This pressure tool fit around the wheel and damaged stud; and a spacer that fit between the front of the wheel and the pressure tool. This spacer serves primarily to catch the stud once removed. In operation, the broken or damaged stud is removed by placing the placing the pressure tool and spacer around the stud to be replaced. A stud screw mechanism in the pressure tool is rotated to cause the tool to apply force to the stud primarily on the backside of the wheel. This force is increased until it overcomes the force that holds the stud in the wheel. At this point, the force of the pressure tool on the stud causes the stud to move in the desired direction for removal.

5 Claims, 6 Drawing Sheets

WHEEL STUD INSTALLATION TOOL

CROSS REFERENCE TO RELATED APPLICATION

This application is a voluntary divisional application of and claims priority from application Ser. No. 09/294,421, filed on Apr. 19, 1999, now abandoned, the contents of which are incorporated herein by reference.

FIELD OF THE INVENTION

This invention relates generally to devices used to replace a stud in a wheel, and more particularly, to an improved and simplified device for replacing one or more large studs in a wheel for a vehicle such as a tractor-trailer.

BACKGROUND OF THE INVENTION

Large vehicles such as semi-tractors and trailers, class "A" recreational vehicles, and the like, typically have a pair of wheels on each hub of a support axle, such as a rear axle. The pairs of wheels are provided to support the substantial loads with which the vehicles operate. The wheels are secured to the hub by a plurality of lugs. Each lug typically includes a euclid stud that is affixed to the hub and an inner cap nut threaded onto the stud for securing the inner wheel to the hub. The outer wheel is secured to each lug by a nut.

When the inner tire of the pair has to be replaced, due a flat or wear, for example, it is often difficult to remove the inner wheel. The difficulty results from the fact that during use, rust and corrosion forms between the two wheels, due to weather and road grime. Particularly, rust and corrosion form between the threaded interfaces of the nut and cap nut and the cap nut and stud. The buildup of corrosion between the nut and cap nut is often greater than the buildup of corrosion between the cap nut and stud. The corrosion formed between the nut and cap nut often virtually freezes these components together.

A disadvantage of known tools for removing the wheels from the hub, such as pneumatic sockets or punches for example, is that they attempt to remove the nut or cap nut from either the cap nut or stud, prior to removing the corrosion from the threaded interface. As force is applied to the nut from the socket, the corrosion causes the socket to rotate on the nut, before the nut or cap nut can break free from the threaded interface. As the socket rotates on the nut or cap nut, the edges of the nut or cap nut become rounded, thus stripping the component. Drilling or other means must then be used to remove the nut or cap nut, prior to removing the desired wheel.

A further disadvantage of pneumatic tools is that they are somewhat expensive to purchase and not easily transportable. Use of pneumatic tools at remote locations requires that the user have an impact wrench, as well as an air compressor on their vehicle for operating the impact wrench. It is well known that these devices are substantially expensive.

Replacement of the stud is commonly accomplished by removing the broken stud by driving it out of the hole in the inner hub or pressing it out, and then driving or pressing a new stud into that hole. To accomplish this replacement, presently maintenance and replacement procedures require the dis-assembling of the wheel, hub and rotor assembly from the axle. This method at best is very time consuming and requires approximately one to four hours to complete the task of stud removal and replacement. The extended down time of the transportation vehicle quickly becomes very expensive and counter-productive to the transportation industry.

Another conventional procedure for removing a broken lug involves cutting the lug away. If the lug is broken very near its inner end, removal in this way is often difficult, as there is not enough exposed material to obtain purchase with a gripping tool. In such a case, the mechanic must often resort to use of a chisel or cutting torch which may cause damage to the inner studs and even the wheel hub itself. Further, use of a chisel or torch to cut away the lug requires a substantial amount of mechanic time, which also results in substantial loss of truck travel time.

One prior art tool incorporates a plate-mounted cutter. The plate has holes, which register with the stud-mounted lugs adjacent the broken nut. The cutting portion of the device registers with the broken nut. The plate is secured in place by tightening nuts against the mounting plate at the adjacent lugs. The cutter is then manually operated through a ratchet tool to sever the flared portion of the lug from the inner stud. One such tool of this type is sold under the designation "Bud Nut Cutter".

Another tool for removing broken threaded fasteners is shown in U.S. Pat. No. 3,913,427. This patent describes a tool for removing broken threaded fasteners which tool has an open-ended gripping member which has a recess with an interior wall having ridges which grip the fastener when driven onto the fastener. The gripping member is fixed at one end of a threaded shaft and extends to the end wall of a sleeve and is attached at the other end to a flatsided head. A movable nut is threaded to the shaft between the sleeve and the head for removing the gripping member from the broken fastener after it has been loosened.

U.S. Pat. No. 4,781,082 discloses a broken stud and nut remover. The patent shows a two-piece kit for removal of a damaged wheel lug stud and includes a nut having a splined aperture and a drive-on tool. The drive-on tool has a recess in one end for loosely accepting the nut when the nut is placed in the recess. When the nut is driven on the lug, the interior edges of the nut grip the lug stud so a gripping member attached to the rod end 21 may thereafter twist the nut.

Thus, while the aforementioned procedures and tool for removing lugs are in some cases effective, they are not effective in all cases and may require excessive time or labor.

Studs extend from the inner wheels and are adapted to receive lug nuts to hold the outer wheels. Heavy duty transportation vehicles such as large trucks, busses and standard cars and trucks invariably are subjected to wheel stud failures. These stud failures are caused by fatigue due to long term use and in most cases to high stress and strains experienced in every day use. Some failures are caused by routine preventative maintenance procedures. Other times lugs simply break from being pulled too tight or may have stripped threads. In any case, the failed stud must be replaced.

Accordingly, there is a need in the art for a reliable, convenient tool for quickly removing the remaining portion of a broken lug from wheel studs. There also exists a need for a tool that can remove a nut from a corroded threaded interface with a cap nut, and remove a cap nut from a corroded threaded interface with a euclid stud without causing harm to either the components of the lug or the wheel.

SUMMARY OF THE INVENTION

The object of this invention is to provide a means to remove broken studs from a wheel of a transportation vehicle.

It is another object of this invention is to provide a means to install a new stud in a wheel of a transportation vehicle It is another object of this invention to provide a kit to reduce the amount of time required to replace broken studs in a wheel of a transportation vehicle.

It is another object of this invention to provide a kit to replace a stud in a wheel of a transportation vehicle without disassembling the wheel.

It is another object of this invention to provide a kit to replace a stud in a wheel of a transportation vehicle that is adaptable to multiple transportation vehicles.

This invention pertains to devices for the installation of replacement studs in the inner hub of a dual wheel unit. Such dual wheel units are common on buses, heavier trucks and trailers and are also used on some recreational vehicles such as motor homes and off-road equipment. By this present invention, it is possible to accomplish the replacement of the broken stud without requiring the removal of the inner hub and its bearing and seal. The tool is convenient to use in any place where either hydraulic or pneumatic power is available. The tool is relatively small and convenient.

The stud replacement kit of the present invention operates by supplying force to the inside portion of a damaged stud and pushing that stud forward and out of the wheel. The kit of the present invention comprises a pressure tool that supplies force to a stud. This pressure tool fit around the wheel and damaged stud; and a spacer that fit between the front of the wheel and the pressure tool. This spacer serves primarily to catch the stud once removed. In operation, the broken or damaged stud is removed by placing the placing the pressure tool and spacer around the stud to be replaced. A stud screw mechanism in the pressure tool is rotated to cause the tool to apply force to the stud primarily on the backside of the wheel. This force is increased until it overcomes the force that holds the stud in the wheel. At this point, the force of the pressure tool on the stud causes the stud to move in the desired direction for removal.

To install a new stud, the spacer is removed a force is applied directly to the stud on the front side of the wheel. This force causes the stud to move forward into the stud slot in the wheel.

The size of the tool components can be varied depending in the difficulty of the stud being replaced without departing from the scope of this disclosure.

DETAILED DESCRIPTION OF THE INVENTION

Figure 1:
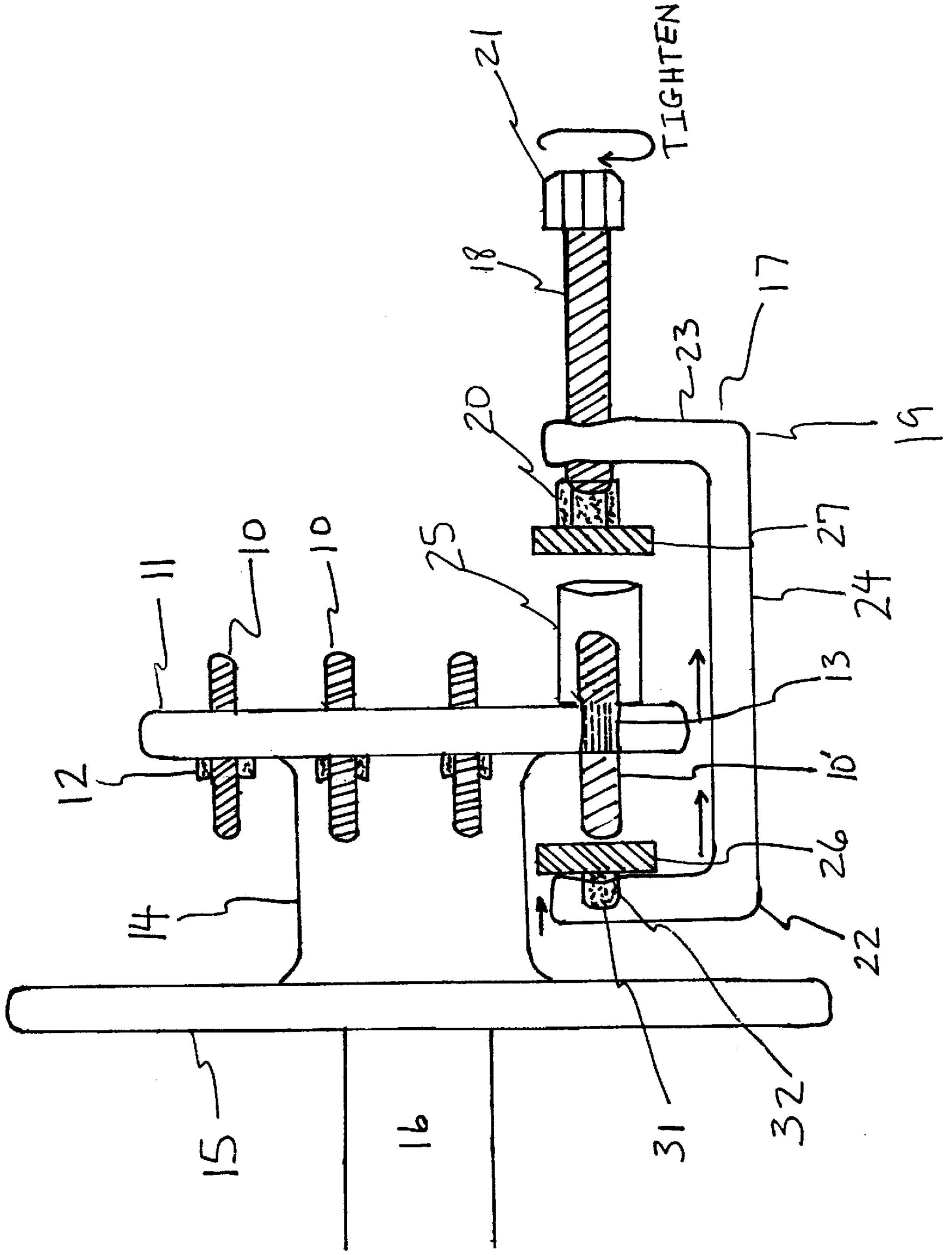
FIG. 1 is a general view of the removal implementation of the kit of the present invention.

The present invention substantially reduces the amount of time and effort required to replace a broken or damaged stud on a wheel. Referring to 1, studs 10 fit through the wheel 11 and are attached to the wheel by nuts 12. In this FIG. 1, the nuts 12 are attached to the inside/back side of the wheel. Locking grooves 13 inside the stud also hold the stud to the wheel. This wheel attaches to a hub 14. The hub is attached to the rotor 15 that fits over and is attached to the wheel axle 16. The pressure clamp 17 has a driver 18 and a clamping bracket 19. The driver is a threaded rod with a flat head 20 on the inside end and a multi-sided outer end 21. This multi-sided outer can vary in shape. However, the outer end must be such that it can adequately engage a means that will be used to supply the force to turn the rod. In addition, a cap to facilitate operation of the rod can cover each end of the rod. For example, a cap to improve the grip can be attached to the outer end 21 of the rod and a cap to expand the contact surface can be used on the flat end of the rod. This bracket has an inner side 22, an outer side 23 and a bridge 24 that connects the inner and outer sides. Each end has an opening therein. The opening in the inner side 22 is to allow for the wheel stud to pass through during stud installation. The threaded rod 19 extends through the opening in the outer side 23 of the clamping bracket 19. The clamping bracket can have a generally square shape, a rectangular shape or even possibly a C-shape with one open side. The clamping bracket fits around the portion of the wheel containing the broken stud. As shown there is enough clearance between the wheel and the rotor to enable the inner side 22 of the clamping bracket to fit around the wheel. A spacer 25 fits over the front side of the broken stud 10. A flat plate 26 fits between the clamping bracket 19 and the broken stud 10. This spacer serves to cover a hole in the inner side of the clamping bracket. Another plate 27 fits between driver head 20 and the spacer 25. This plate can be attached to the head of the driver or can remain detached. The bracket must be of a size such that the inner and outer sides are far enough apart to enable the stud, wheel, spacer and plates to easily fit between the two sides of the bracket prior to removing a broken stud or installing a new stud.

The inner side 22 of the clamping bracket has an opening 31 that can serve as a receptacle for a stem 32 that is attached to plate 26. This stem enables the clamping bracket to hold the plate without any assistance during the stud removal operation.

As the rod 18 turns it moves through the clamping bracket toward the spacer 25. This movement decreases the distance between the inner side 22 and the flat head 20 of the rod. As the distance decreases the pressure between the inner side and the flat head increases. If the plate 27 is not attached to the driver head, the driver head will first contact the plate 27. As the rod moves through the outer side 23 of the clamping bracket, the outer side of the clamping bracket moves down the rod and causes the inner side of the clamping bracket to move in that same direction and toward the plate 26 and the broken stud 10. As the driver flat head contacts the spacer 25 and the plate 27, and the inner side contacts the spacer 26 and the broken stud, pressure will build on the portion of the stud that is on the inner side of the wheel. This pressure will begin to push the stud in the direction of the spacer 25 on the outer side of the wheel. Because the spacer is hollow at the wheel, there is no pressure on the broken stud from the driver flat head. All of the pressure on the stud is from the inner side of the bracket in an outward direction. The pressure continues to increase until the pressure forces the broken stud out of the wheel and into the spacer.

Figure 2:
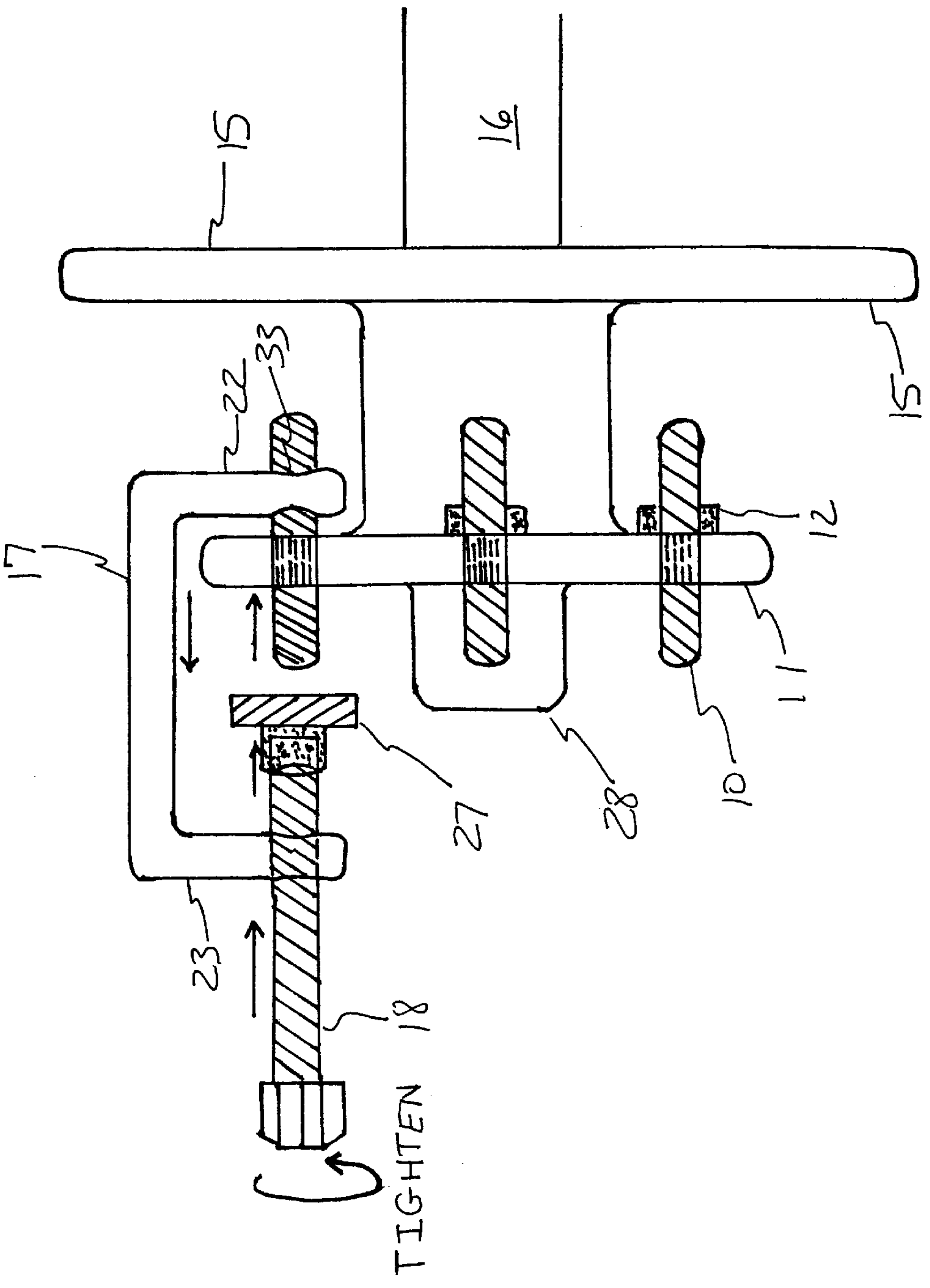
FIG. 2 is a general view of the installation implementation of the present invention.

Referring to FIG. 2, the installation of a new stud uses the driver head 20 and plate 27 to push a new stud into place. In this operation, the clamping bracket fits around the wheel in the location for the new stud to be installed. The end portion of a stud can be initially placed in the slot in the wheel. As the driver moves toward the stud, the plate 27 will contact the stud. Pressure from the driver forces the plate forward thereby forcing the stud into the slot. The inner portion of the bracket will initially be against the inner side of the wheel 11. As the pressure increases it will secure the inner side of the bracket against the wheel. The inner side 22 can have a complete opening 33 to allow the stud to pass through the bracket side. The opening 33 can also serve as a receptacle for the stem 32 if this bracket were used in a stud removal procedure. When the stud is forced through the slot in the wheel, care must be taken to align the stud with the opening in the inner side 22 of the bracket. The stud will protrude through wheel a desired distance depending on the size of stud. At this point the driver motion is reversed, the pressure is decreased and the pressure clamp 17 removed. A hubcap 28 can be secured over the newly installed stud.

Figure 3:
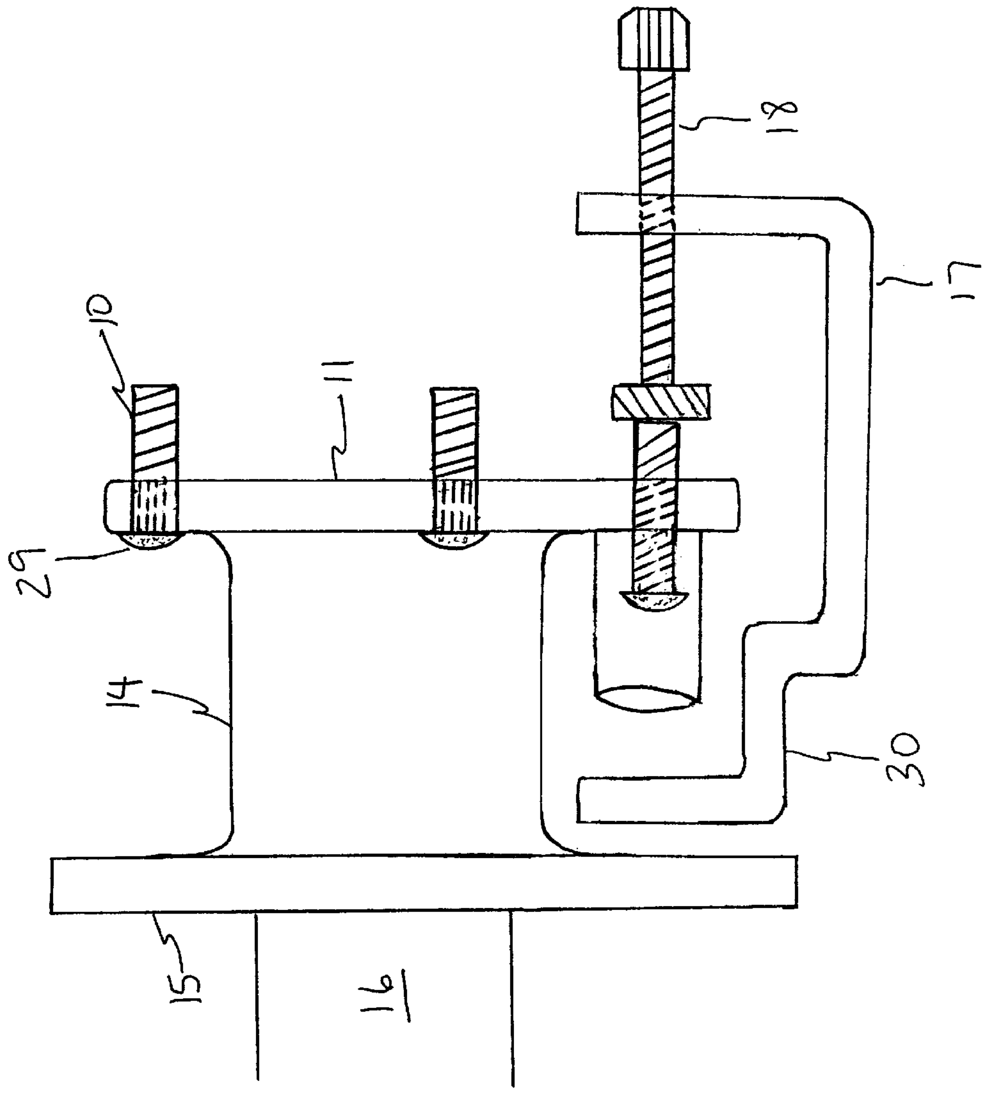
FIG. 3 is a general view of an alternate stud removal implementation.

FIG. 3 shows another embodiment of the invention that has applications primarily in passenger cars. In this design, the clamping bracket has a two-tear bridge section 30 to accommodate other vehicle components that may be located near the wheel. These components are mainly from the braking system. The modification is necessary also because some passenger cars use a different type of stud 29 in the wheel. This stud has a flat head that secures the stud to the wheel instead of a nut. Therefore, this stud can not be removed by driving it forward and out of the wheel. This stud has to be forced out the inner side of the wheel. A spacer 25 is located on the inside of the wheel 11. As the driver 18 forces the stud out, the spacer serves to collect the stud similar to the other embodiments. In addition, because this stud has to be driven out the inner side, it was necessary to modify the clamping bracket to ensure that there was enough clearance between the wheel 11 and the rotor 15. For installation of this type of stud, the spacer 25 would be in contact with the outside of the wheel. The inner side 22 of the clamping bracket would supply the force to drive the new stud in an outward direction and into position in the wheel.

Figure 4:
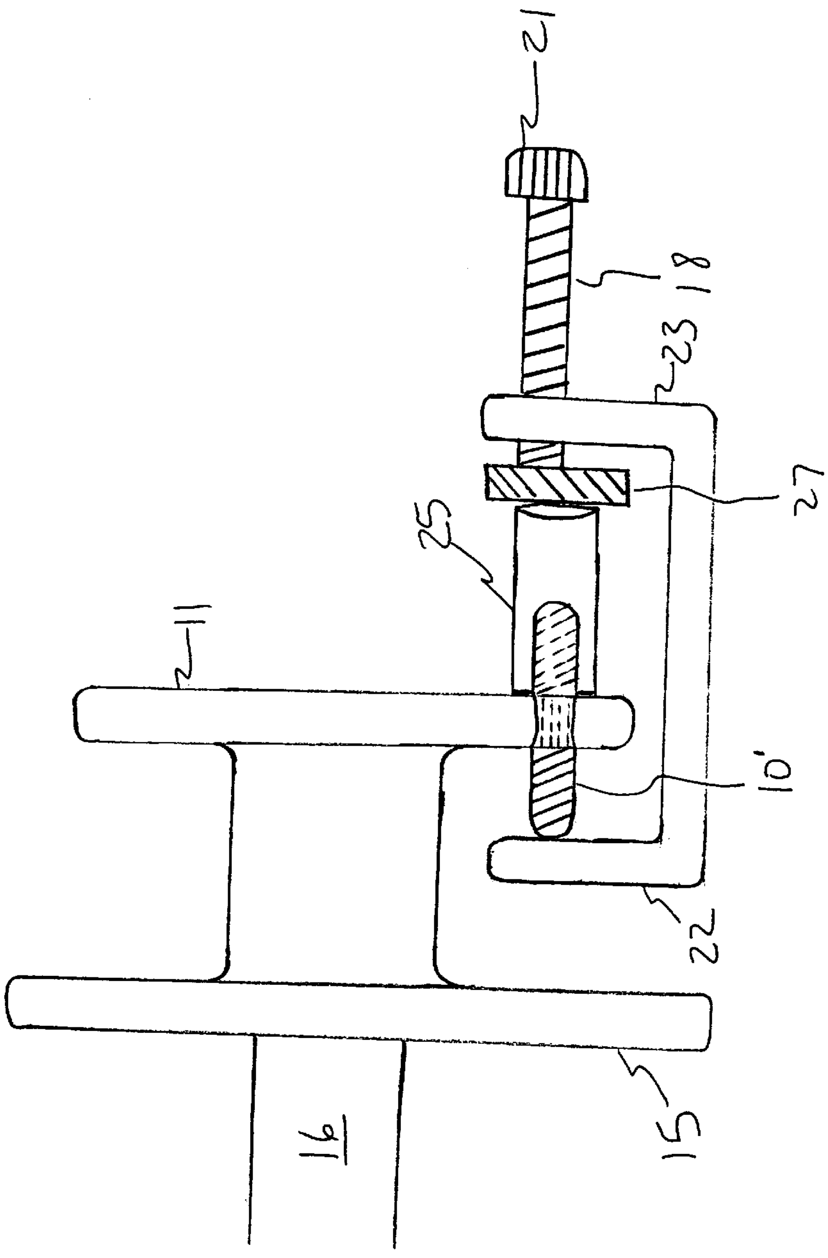
FIG. 4 is a general view of a removal concept of the present invention.
Figure 5:
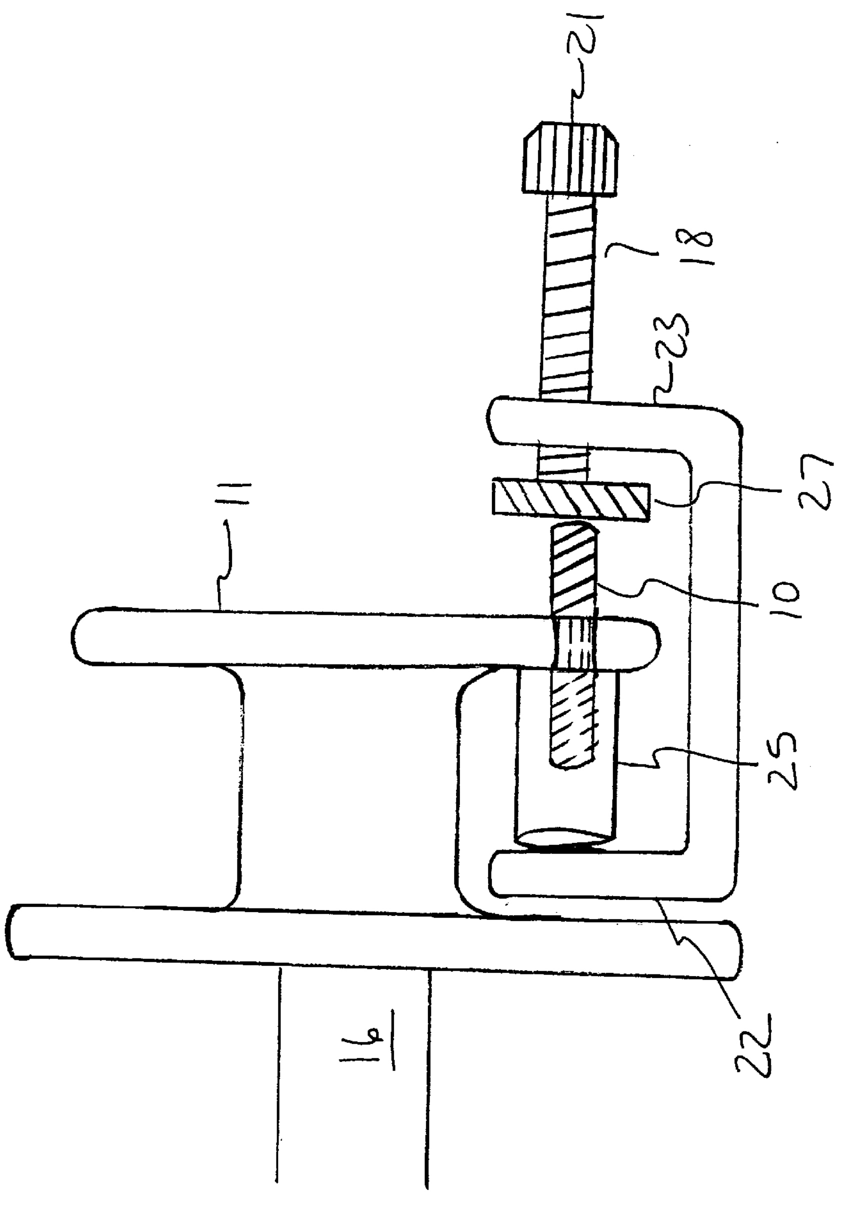
FIG. 5 is a general view of an installation concept of the present invention.

FIGS. 4 and 5 show an embodiment of a stud replacement system of the present invention. In this design, one clamping bracket can used to remove and install a stud. The major key to this design is the placement of the spacer 25. As shown in FIG. 4, during the removal, the spacer is located on the outer side of the wheel 11 similar to FIG. 1. During the installation of the new stud shown in FIG. 5, the spacer is located on the inner side of the wheel similar to FIG. 3. The spacer used in this design has to be long enough to hold the entire stud during the removal. During the installation, the driver is turned such that the turning process stops when the stud has reached the desirable position.

Figure 6:
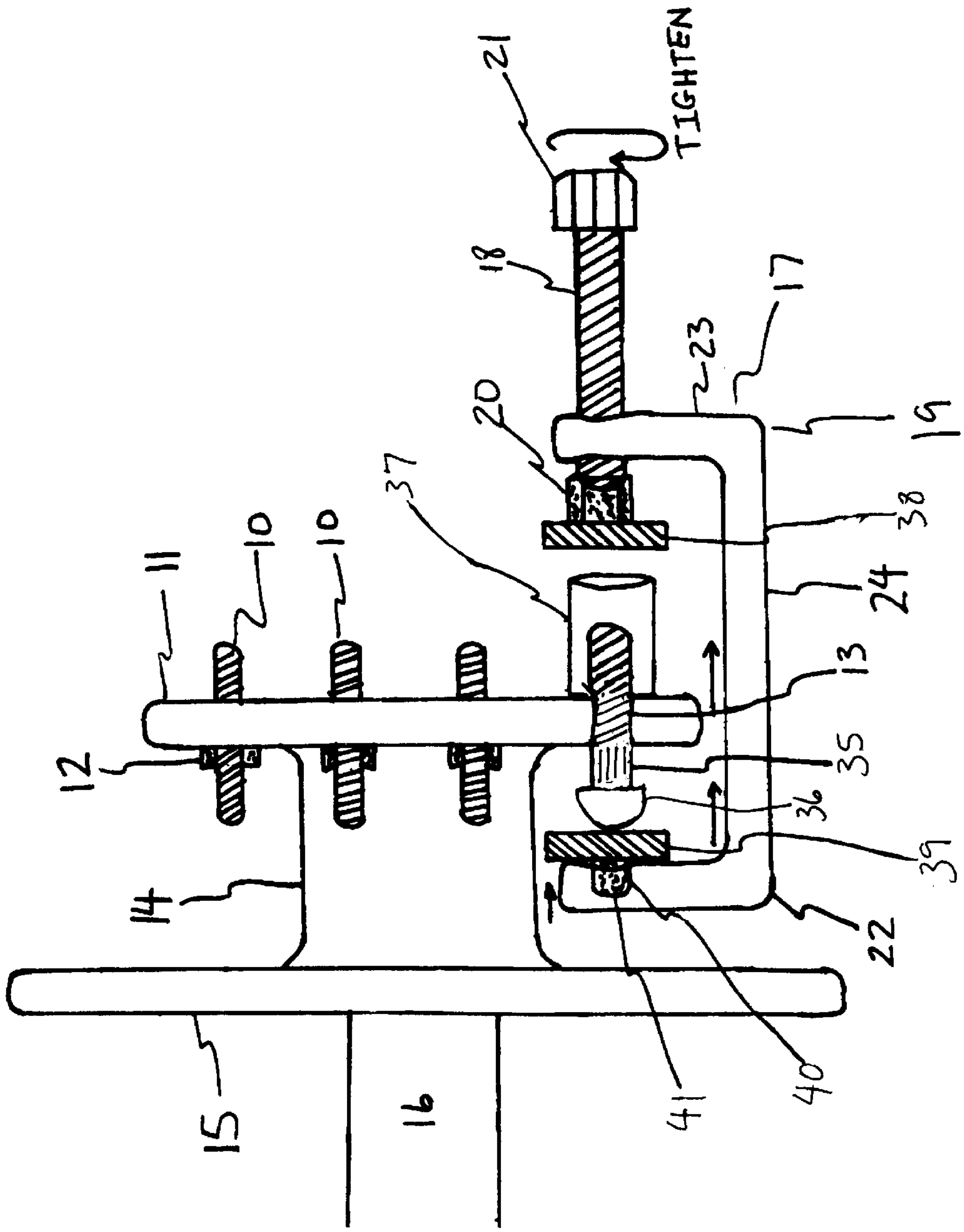
FIG. 6 is a general view of a stud installation concept of the present invention.

FIG. 6 shows an embodiment of a stud installation configuration of the present invention. In this design, the stud 35 has a head 36 on its inner end. As shown, a spacer 37 fits over the outside portion of the stud. A plate 38 contacts the closed end of the spacer. The inner side of the clamping bracket 22 of the clamping bracket 19 comes in contact with the stud head 36. The inner side 22 can be completely solid or can have a partial or complete opening 40. A plate 39 can have a stem 41 that can fit into opening 40 and cover the opening and thereby provide side surface that will contact the stud head.

This embodiment operates in a manner similar to FIG. 1. As the rod 18 turns it moves through the clamping bracket toward the spacer 37. This movement decreases the distance between the inner side 22 and the flat head 20 of the rod. As the distance decreases the pressure between the inner side and the flat head increases. If the plate 38 is not attached to the driver head, the driver head will first contact the plate 38. As the rod moves through the outer side 23 of the clamping bracket, the outer side of the clamping bracket moves down the rod and causes the inner side of the clamping bracket to move in that same direction and toward the plate 39 and the new stud 35. As the driver flat head contacts the spacer 37 and the plate 38, and the inner side contacts the spacer 26 and the new stud, pressure will build on the portion of the stud that is on the inner side of the wheel. This pressure will begin to push the stud in the direction of the spacer 37 on the outer side of the wheel. Because the spacer is hollow at the wheel, there is no pressure on the new stud from the driver flat head. All of the pressure on the stud is from the inner side of the bracket in an outward direction. The pressure continues to increase until the pressure forces the new stud into the desired position in the wheel.

This invention provides significant advantages over the current art. The invention has been described in connection with its preferred embodiments. However, it is not limited thereto. Changes, variations and modifications to the basic design may be made without departing from the inventive concepts in this invention. In addition, these changes, variations and modifications would be obvious to those skilled in the art having the benefit of the foregoing teachings. All such changes, variations and modifications are intended to be within the scope of this invention, which is limited only by the following claims.

I claim:

1. A tool for installing a wheel stud in a vehicle wheel without requiring the removal of the wheel from the vehicle axle comprising:

a) a clamping bracket having an inner side, an outer side and a bridge section that connects said inner and outer sides, said inner side to be positioned between a vehicle axle and a vehicle wheel such that the inner side of the clamping bracket is in contact with a wheel stud that is positioned in a hole in the vehicle wheel for installation into the vehicle wheel, said clamping bracket also having an opening through said outer side of the bracket;

b) a threaded pressure rod, which passes through the opening in said outer side of said clamping bracket, said pressure rod having an inner end and an outer end, said pressure rod capable of being rotated in order to move the pressure rod in the direction of the vehicle wheel and thereby decreasing the distance between the inner end of the pressure rod and the vehicle wheel; and c) a spacer, being hollow with an inner end and an outer end, said inner end of said spacer being open to allow for the extension of the wheel stud into the hollow spacer, said inner end of said spacer being in contact with the vehicle wheel at the location of the positioned wheel stud and said outer end of the spacer being solid and in contact with said inner end of said pressure rod such that when said pressure rod is rotated pressure is created on the inner side of the clamping bracket that is in contact with the wheel stud such that the wheel stud is pressed in the direction of the spacer and securely into the vehicle wheel.

2. The stud installation tool as described in claim 1 wherein said inner end of said pressure rod comprises a flat head for contacting said solid outer end of said spacer and wherein said outer end of said pressure rod comprises a multi-sided head capable of being engaged for the purpose of rotating said pressure rod.

3. The stud installation tool of claim 2 further comprising first plate positioned between and in contact with said pressure rod and said spacer.

4. The stud installation tool of claim 3 further comprising a second plate positioned between said inner side of said clamping bracket and the stud to be installed, said second plate having a stem for holding said second plate in position in relation to said clamping bracket said stem fitting into an opening in said inner side of said clamping bracket.

5. The stud installation tool as described in claim 1 further comprising a plate attached to the inner side of said clamping bracket such that said plate contacts the wheel stud during stud installation.

* * * * *